April 11, 1967     B. C. LACKMAN     3,313,142
SHOCK ABSORBER TESTING DEVICE
Filed May 7, 1965     2 Sheets-Sheet 1
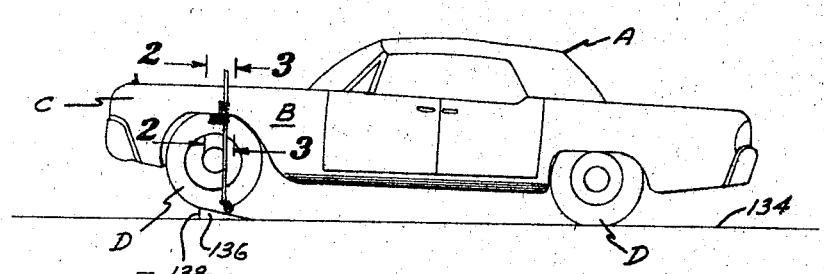
FIG. 1
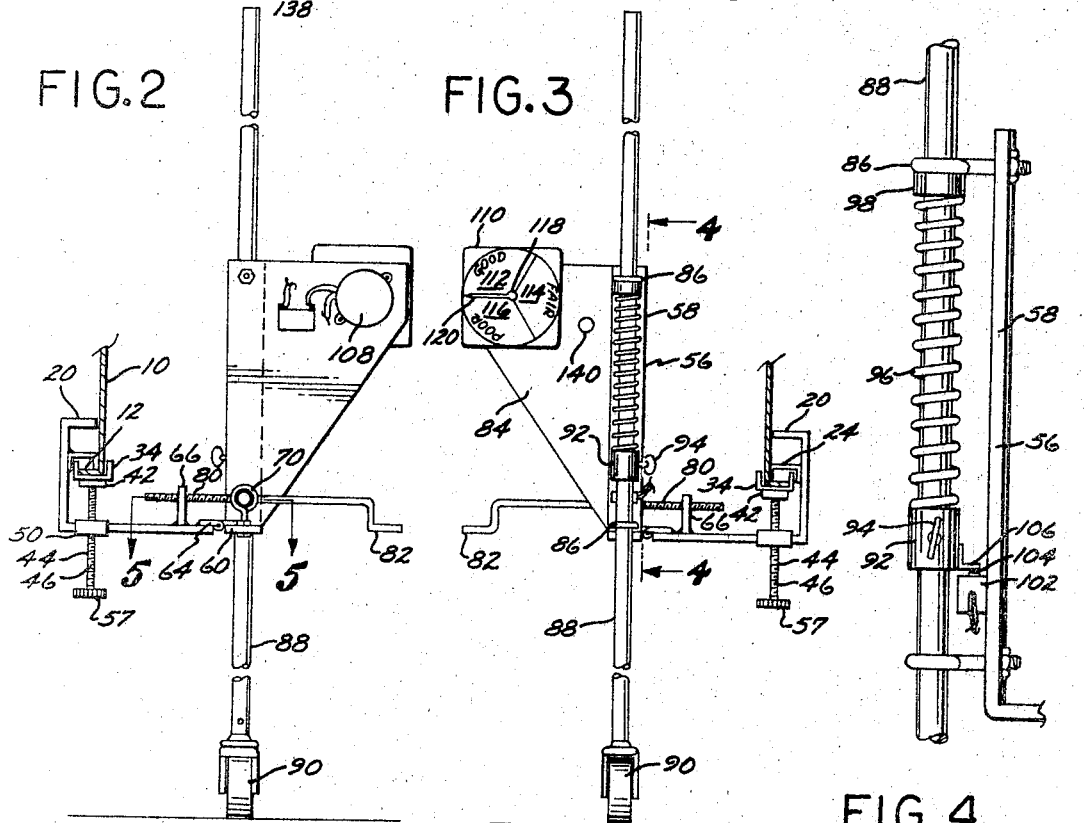
FIG. 2     FIG. 3
FIG. 4
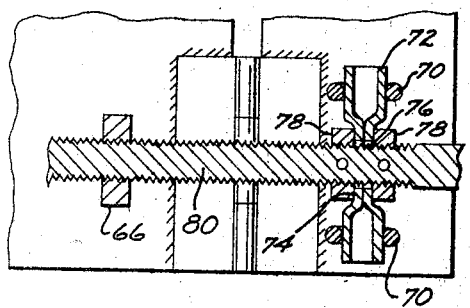
FIG. 5
INVENTOR.
BURDETTE CARL LACKMAN
BY
William C. Babcock
ATTORNEY

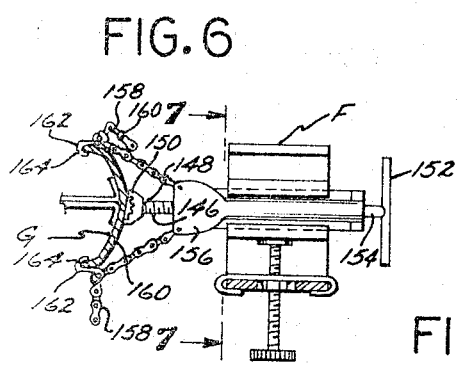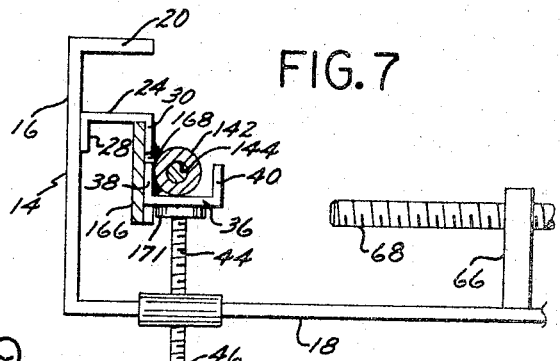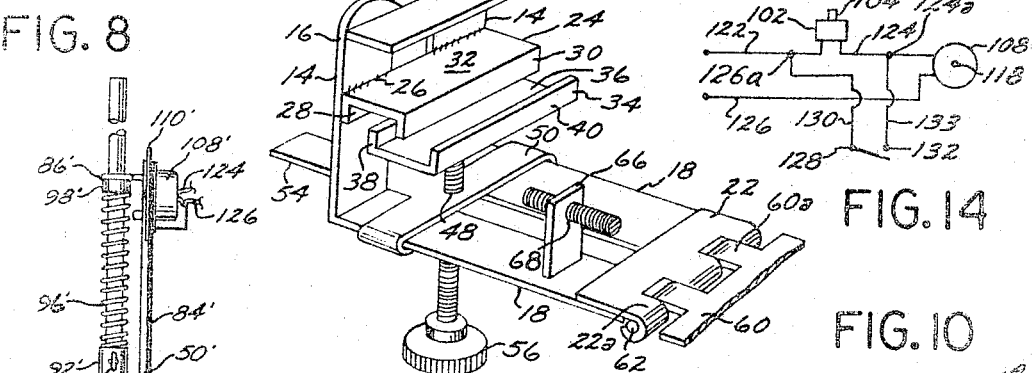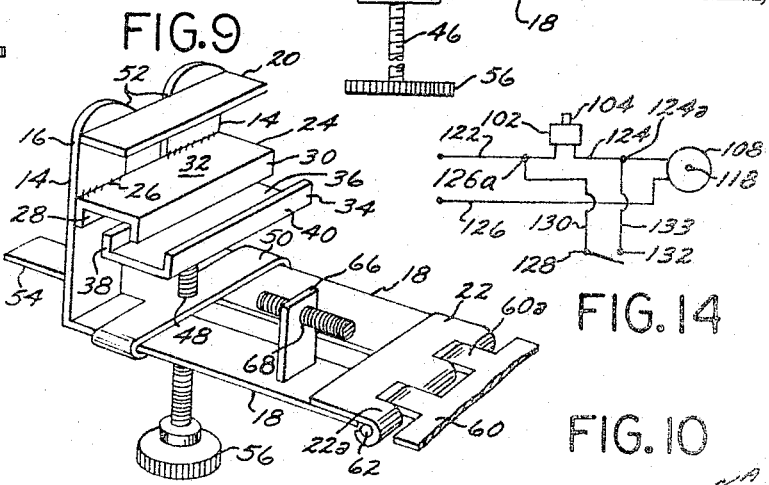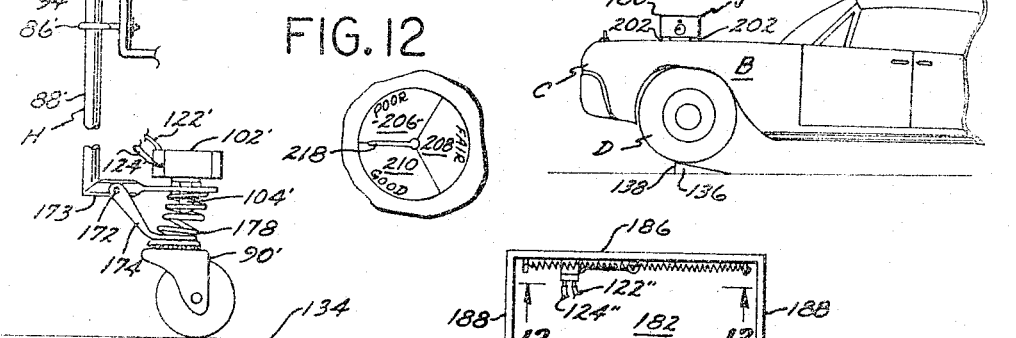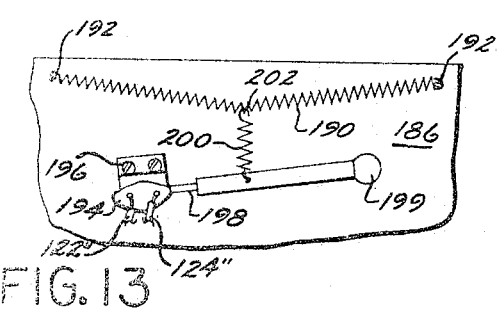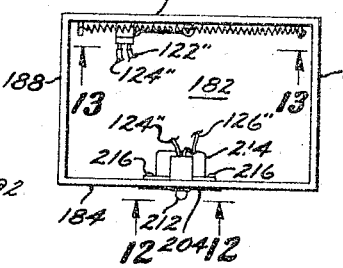

United States Patent Office 3,313,142
Patented Apr. 11, 1967

1

3,313,142
SHOCK ABSORBER TESTING DEVICE
Burdette C. Lackman, 215 S. Sullivan St.,
Santa Ana, Calif. 92704
Filed May 7, 1965, Ser. No. 454,013
8 Claims. (Cl. 73—11)

The present application is a continuation-in-part of my copending application entitled Shock Absorber Tester, Ser. No. 306,781, filed in the United States Patent Office on Sept. 5, 1963, now Patent No. 3,187,554.

The present invention relates generally to the field of automotive equipment, and more particularly to a device for testing shock absorbers on automotive vehicles while in place thereon.

Hydraulic shock absorbers are used almost universally on passenger automotive vehicles which serve to minimize the vertical oscillatory movement of the sprung portoin of the vehicle relative to the unsprung portions thereof. However, shock absorbers are normally concealed within the confines of an automotive vehicle, and to remove the same for inspection or testing purposes, is a time-consuming operation, that requires a thorough knowledge of the vehicle structure.

A primary object of the present invention is to provide a preferred and certain alternate forms of the shock absorber testing device of relatively simple mechanical structure, that are quick and easy to use, permit the testing of shock absorbers while they remain in place on a vehicle, and can be successfully operated by personnel having little or no experience in testing work.

A further object of the invention is to supply shock absorber testing equipment that occupies a minimum of space when not in use, is portable, and due to its production cost, can be retailed at a sufficiently low price as to encourage the widespread purchase thereof.

These and other objects and advantages of the invention will become apparent from the following description thereof, and from the accompanying drawings illustrating the same in which:

FIGURE 1 is a side elevational view of an automotive vehicle with a preferred form of the testing device removably mounted thereon;

FIGURE 2 is a side elevational view of a preferred form of the device removably affixed to the front right fender of the vehicle shown in FIGURE 1, taken on the line 2—2 thereof;

FIGURE 3 is a side elevational view of the preferred form of the testing device removably affixed to the left front fender of the vehicle shown in FIGURE 1, taken on line 3—3 thereof;

FIGURE 4 is an enlarged fragmentary side elevational view of the device shown in FIGURE 3, taken on the line 4—4 thereof;

FIGURE 5 is a fragmentary transverse cross-sectional view of the device shown in FIGURE 2, taken on the line 5—5 thereof;

FIGURE 6 is a top plan view of an assembly for removably supporting the preferred form of the testing device from an automotive vehicle;

FIGURE 7 is a side elevational view of the assembly shown in FIGURE 6, taken on the line 7—7 thereof;

FIGURE 8 is a side elevational view of a first alternate form of the device;

2

FIGURE 9 is a perspective view of a portion of the preferred form of the device shown in FIGURE 1;

FIGURE 10 is a side elevational view of an automotive vehicle with a second alternate form of the shock absorber testing device removably mounted thereon;

FIGURE 11 is a top plan view of the interior of the second alternate form of the testing device;

FIGURE 12 is an enlarged side elevational view of the visual indicator forming a part of the second alternate form of the device, taken on the line 12—12 of FIGURE 11;

FIGURE 13 is a fragmentary side elevational view of a portion of the second alternate form of the device, taken on the line 13—13 of FIGURE 11; and FIGURE 14 is a diagrammatic view of the electric circuit used with the preferred form of the device.

With continued reference to the drawings, particularly FIGURE 1, an automotive vehicle A is shown that has a sprung portion B, of which fenders C are a part, and an unsprung portion of which the wheels D are a part. The function of automotive shock absorbers (not shown) is to minimize the vertical oscillatory movement of the sprung portion B to the unsprung portion, as the vehicle A travels over a rough road surface, or an irregular terrain. The shock absorbers achieve the above function of dampening out the said oscillation by using the energy which tends to cause such movements to force hydraulic fluid through passages that offer high resistance to such flow.

The degree of affectation of the shock absorbers on the automobile will be inversely proportional to the number of oscillations made by the sprung portion of the vehicle relative to the wheels D, after one or more of the wheels is to run off a sharp drop-off E, such as best shown in FIGURE 1. On many automobiles in present-day production, the fenders are defined by a downwardly extending wall 10, the lower edge portion of which is bent inwardly to define a flange 12.

Two laterally spaced L-shaped members 14 are provided, each of which includes a vertical leg 16, and a horizontal leg 18. The upper ends of legs 16 are connected by a crossbar 20. The rear ends of legs 18 are connected by a cross piece 22, as best seen in FIGURE 14. A first channel 24 is secured in a transverse position relative to the first legs 14 below crossbar 20 by welding beads 26, or the like, shown in FIGURES 2, 3 and 14. Channel 24 includes two legs 28 and 30 that are connected by a web 32.

A second channel 34 is positioned below channel 24 and includes a web 36 from which two flanges 38 and 40 project upwardly. The web 36 has a rigid body 42 affixed to the underside thereof, which body rotatably engages the upper end of a rod 44. Exterior threads 46 are formed on rod 44 that engage a tapped bore 48 formed in a slide 50 which rests on the upper surfaces of the two legs 18. The two legs 16 are separated by a space 52, as can best be seen in FIGURE 14. An alignment member 54 extends forwardly from slide 50 through space 52, to at all times maintain the slide in a position normal to the longitudinal sides of the legs 18. A handle 57 of conventional design is rigidly affixed to the lower end of the rod 44, as shown in FIGURES 2 and 14.

An L-shaped bracket 56 is provided that includes a vertical leg 58 and a horizontal leg 60, as best illustrated in FIGURES 2 and 3. The cross piece 22 and leg 60 have two tubular inter-engaging laterally spaced portions 22a and 60a respectively, that are in transverse alignment and engaged by a pin 62. The portions 22a, 60a and pin 62 cooperatively provide a hinge designated generally by the numeral 64, which permits pivotal movement of the legs 18 relative to the leg 60. A short rigid upright 66 is affixed to the upper surface of one of the legs 18, in which upright a tapped horizontal bore 68 is formed. Two transversely spaced eye bolts 70 extend upwardly from the leg 60, as shown in FIGURES 2 and 5.

A tube 72 having a flattened center portion 74 is pivotally supported in the two eye bolts 70 (FIGURE 5). A bore 76 extends through the flattened portion 74. Two nuts 78 are affixed to opposite sides of the flattened portion 74 by conventional means and in alignment with bore 76. An externally threaded rod 80 engages the nuts 78, as well as the tapped bore 68 in the upright 66. One end of rod 80 is bent to define a crank 82 as shown in FIGURE 2.

A panel 84 is secured to one side of the leg 58 of bracket 56 by conventional means, as best seen in FIGURES 2 and 3. The leg 58 on the side opposite that to which the panel 84 is affixed has two vertically aligned eye bolts 86 projecting therefrom. An elongate tubular member 88 is slidably supported in the eye bolts 86, as shown in FIGURE 3. The lower end of the tubular member 88 is provided with a caster 90 of conventional design. A collar 92 is mounted on the tubular member 88 between the eyebolts 86, as shown in FIGURE 3. A tapped bore (not shown) extends transversely through one wall of collar 92, and this bore is engaged by a thumbscrew 94. By tightening the thumbscrew 94, the collar 92 can be held in a desired longitudinal position on the tubular member 88. A compressed helical spring 96 encircles the tubular member 88 (FIGURES 3 and 4), with the lower end of the spring abutting against the upper surface of the collar 92, and the upper end of the spring in pressure contact with a ring-shaped spacer 98 situated below the upper one of the two eye bolts 86. By loosening the screw 94, the member 88 can be adjusted vertically relative to the bracket 56 to dispose the caster 90 in contact with the surface on which the wheels D rest.

The leg 58 of bracket 56, as can best be seen in FIGURE 4, supports an electrical switch 102 provided with a spring-loaded actuator 104, which when allowed to move upwardly, places the switch 102 in a closed position. A clip 106 is affixed to collar 92 and is in vertical alignment with the actuator 104. The compressed helical spring 96 at all times tends to move the clip 106 downwardly relative to actuator 104, whereby the switch 102 is normally in an open position.

A small, geared-down synchronous motor 108 is mounted on the panel 84. The drive shaft 118 of motor 108 extends through an opening in the panel 84, as well as through a panel-supported dial 110 that is calibrated into three wedge-shaped areas 112, 114, and 116, on which the words "Good," "Fair" and "Poor," respectively, are imprinted. The drive shaft 118 supports an indicating needle 120 on the outer end thereof, that can sweep over the areas 112, 14 and 116 when the motor 108 is electrically energized. The position at which the needle 120 stops relative to areas 112, 114 and 116, indicates the condition of the shock absorbers on the vehicle A, the reasons for which will later be explained in detail.

The switch 102 is connected to two electrical conductors 122 and 124, as can best be seen in FIGURE 14. The motor 108 also has an electrical conductor 126 connected thereto. The two conductors 122 and 126 are connected to a source of electrical energy (not shown) such as a domestic electrical outlet. The circuit also includes a normally open electrical switch 128, the blade of which is connected by a conductor 130 to junction point 126a in conductor 126. The switch 128 is of the single pole, single throw type, and a contact 132 forming a part thereof is connected to the conductor 124 at junction point 124a by a conductor 133. By closing the switch 128, electrical current flows to the motor 108 and permits the motor to rotate the needle 120 to the starting position shown in FIGURE 3, prior to the shock absorbers (not shown) of vehicle A being tested.

In using the preferred form of the device, it is positioned alongside either the left or right front fender C, as shown in FIGURES 1–3 inclusive. The slide 50 is then moved into vertical alignment with the flange 12 of the fender C. The handle 57 is then rotated to raise the second channel 34 into engagement with the lower surface of the flange 12. The flange 12, and the side wall 10 are then gripped between the first and second channels 24 and 34, with the interior surface of the side wall 10 in abutting contact with the longitudinal edge of the crossbar 20.

On occasion it may be found that the side wall 10 of the fender of the vehicle A, is not truly vertical, and to place the tubular member 88 in a vertical parallel position, the crank 82 is rotated to pivot the bar 60 relative to the legs 18 until vertical positioning of the tubular member is attained. By vertically adjusting the tubular member 88, the caster 90 can be caused to contact the floor surface 134 on which the wheels D of the vehicle A are supported. A wedge-shaped block 136 is provided that is sufficiently wide to permit one of the front wheels D of the vehicle A and the caster 90 to concurrently roll upwardly thereon, and then drop to the floor surface 134, as the wheel and caster pass over the left-hand side 138 of the block.

When the wheel D and the caster 90 adjacent thereto so drop, the sprung portion B of the vehicle is caused to oscillate vertically relative to the unsprung portion of the vehicle, with the number and extent of these oscillations reflecting the operating condition of the shock absorbers (not shown). If there is a substantial oscillation of the sprung portion B of the vehicle A, relative to the unsprung portion after the drop-off, it indicates that the shock absorbers are not dampening out these oscillations, as is their intended function.

In the testing of a vehicle by means of the present invention, the switch 128 is momentarily closed, to cause the motor 108 to move the needle 120 into the starting position shown in FIGURE 3. When the motor 108 is energized, the needle 120 is rotated in a clockwise direction. Should the wheel D, of the vehicle A, and the caster 90 adjacent thereto, drop downwardly from the block 136, the sprung portion B of the vehicle, including the fender C and the bracket 56 oscillate vertically, with a portion of each oscillation being downwardly relative to the clip 106. During the time that the actuator 104 of switch 102 is separated from the clip 106, the electrical circuit to the motor 108 shown in FIGURE 14, is completed, and the motor drives the needle 120 in a clockwise direction.

If the shock absorbers (not shown) on the vehicle A, are in good condition and tend to dampen out the oscillations, the motor 108 will pivot the needle 120 only within the area 112 identified as "Good." If the shock absorbers do not dampen out the oscillations, the oscillations will continue, and the greater the number thereof, the greater will be the degree of rotation of the needle 120 by the motor 108. In the event shock absorbers on the vehicle A do little or nothing to dampen out the oscillations of the sprung portion B of the vehicle A relative to the unsprung portion, the actuator 104 will move upwardly relative to switch 102 to close the electrical circuit to the motor 108 a number of times, and the needle 120 will be rotated in a clockwise direction to the extent that it is pointed in the area 116, which is identified as "Poor." When such a reading on the dial 110 is attained, it indicates that the shock absorbers should either be replaced, or repaired.

In some instances, a transverse cross section of the fender C is such as to preclude the use of the preferred form of the device described above. In those instances where the preferred form of the device cannot be attached to the fender C, a mounting F shown in FIGURES 6 and 7 may be used to removably affix the testing device to the bumper G of the vehicle. The mounting F includes a heavy tubular body 142 having a threaded bore 144 formed therein. The bore 144 is threadedly engaged by a screw 146, which on a first end 148 thereof, rotatably supports a pressure member 150. The screw 146 can be rotated by a handle 152 of conventional design that is affixed to a second end 154 thereof.

On the end thereof most remote from the handle 152, the body 142 develops into an enlarged end portion 156 that pivotally supports the ends of two link chains 158 from which pins 160 project that connect the links thereof. Two heavy wire hooks 162 are provided that are adapted to engage portions of the longitudinal edges 164 of the bumper G as well as a desired set of the pins 160. By rotating the handle 152 in an appropriate direction when the hooks 162 are in engagement with portions of the edges 164 of the bumper G, the chains 158 can be tightened, and the tubular body 142 held in a rigid, outwardly extending position relative to the bumper G.

An elongate plate 166 is positioned along the length of the tubular body 142, which is separated therefrom by a space 168. The plate 166 is affixed at both ends to body 142 by welded beads 171 or other suitable means. The L-shaped members 14 are removably affixed to the support or mounting F, by moving the slide 50 to the position shown in FIGURE 7, where by rotating the rod 44, the second channel 34 can be moved upwardly to permit the flange 38 thereof to enter the space 168, with the web 36 being in pressure contact with the lower surface of the tubular body 142. When the rod 44 is rotated by the handle 57, the tubular body 142 and the plate 166 are concurrently moved upwardly until the leg 30 of the first channel 24 engages the upper portion of the plate, as shown in FIGURE 7. The preferred form of the device is now removably supported from the bumper G of the vehicle and may be used in the testing of the shock absorbers (not shown) of the vehicle in the same manner as previously described.

A first alternate form H of the invention is shown in FIGURE 8 that is similar to the preferred form thereof just described. The components of the alternate form H common to those of the preferred form of the device are identified herein by the same numerals used in conjunction with the preferred form, but with a prime added thereto.

In the first alternate form H of the testing device (FIGURE 8), a horizontal leg 173 is provided on the tubular member 88', the lower end of which supports a transverse pin 172 on which two laterally spaced, downwardly extending arms 174 are pivotally mounted. The lower end of arms 174 support a caster 90'. A compressed helical spring 178 extends between the upper portion of the caster 90' and the lower surface of the leg 173, and tends to at all times maintain the caster 90' in predetermined spacing relative to the leg. The leg 173 supports an electric switch 102' and an elongate actuator 104' extends downwardly through an opening (not shown) in this leg. Switch 102' is connected to electrical conductors 122' and 124' in the same manner as the switch 102.

The tubular member 88' is mounted on the bracket 56', as shown in FIGURE 8, which bracket is removably held on the fender C of the vehicle A, by the mounting assembly shown in FIGURRE 9.

After the first alternate form of the device is so removably affixed to the vehicle A, the thumbscrew 94' on the collar 92' is loosened, to permit vertical adjustment of the tubular member 88' relative to the bracket 56', to the extent that when the caster 90' is in contact with the surface 134, the actuator 104' will be in pressure contact with the upper surface of the caster. The electric switch 102' is in an open position when the actuator 104' is in pressure contact with the upper surface of the caster 90'. When the vehicle A, together with the first alternate form H of the testing device (FIGURE 8) is driven up over the wedge-shaped block 136 and allowed to drop therefrom, the sprung portion B of the vehicle, including the fender C, will oscillate and move the tubular member 88', switch 102', and actuator 104', upwardly relative to the caster 90', and as this intermittent movement takes place, the switch 102' is momentarily placed in the closed position, to cause electric energization of the motor 108, with resultant rotation of the needle 120 relative to the dial 110.

The condition of the shock absorbers on the vehicle A being tested with the first alternate form H of the device will be reflected by the degree at which the needle 120 rotates relative to the dial 110', which dial is identical to dial 110 previously described. The same electrical circuit is used in conjunction with the first alternate form H of the device as used in the preferred form thereof and is illustrated in FIGURE 14.

A second alternate form J of the shock absorber testing device is shown in FIGURES 11, 12 and 13. This alternate form of the device includes a container 180, preferably in the form of a box, having a bottom 182, two side walls 184 and 186, and two end walls 188, as shown in FIGURE 11. The interior surface of the side walls 186, shown in FIGURE 13, support an elongate helical spring 190 therefrom by two pins 192. An electric switch 194 is mounted on the interior surface of the side walls 186 by screws 196, or other suitable fastening means. An actuator 198 is pivotally mounted on the electric switch 194 and forms a part of the switch. When disposed in a first position, the actuator 198 maintains the switch 194 in an open condition. Switch 194 is connected to electrical conductors 122" and 124" in the same manner as the switch 102 used in the preferred form of the device.

A helical spring 200 extends upwardly from actuator 198, with the upper end of the spring 200 being connected to the spring 190 by a hook 202, or other suitable fastening means, also shown in FIGURE 13.

A dial 204 is mounted on the exterior surface of the side wall 184, which dial is divided into three areas 206, 208, and 210, as can best be seen in FIGURE 12. An opening (not shown) extends through the center of the dial 204 and a driven shaft 212 of a synchronous motor 214 extends therethrough. Motor 214 is mounted on the exterior surface of the side wall 184 by screws 216, or other suitable fastening means. The outer end of the shaft 212 supports a needle 218, as can best be seen in FIGURE 12. When energized, the motor rotates the needle 218 in a clockwise direction. The areas 206, 208 and 210 are identified by the words "Poor," "Fair" and "Good," respectively.

Motor 214 is supplied with electrical energy through conductors 124" and 126", and the same electrical circuit shown in FIGURE 14 is used in supplying electric energy to the second alternate form J of the device. A weight 199 is mounted on the right-hand end of the actuator 198, as illustrated in FIGURE 13. Also, a number of vacuum cups 222 are mounted on the bottom 182 of the container 180 for removably supporting the second alternate form J from the hood of the vehicle A as shown in FIGURE 10.

The vehicle A is tested by mounting form J of the device thereon (FIGURE 10) and then driving one of the front wheels D of the vehicle off the wedge-shaped block 136. The sprung portion B of the vehicle A then oscillates, and in turn causes the actuator 198 to pivot upwardly and downwardly. As the actuator 198 alternately pivots downwardly and upwardly, the electrical circuit to the motor 214 is intermittently completed.

From experience it has been found that maximum oscillation of the actuator 198 is secured when the shock absorbers rapidly dampen out reciprocal movement of the sprung portion B of vehicle A relative to the unsprung portion thereof. As a result, the motor 214 will rotate the needle 218 further when the shock absorbers are in good or fair condition over that when they are in a poor condition. The areas 206, 208 and 210 on dial 204 are accordingly reversed relative to the comparable areas 116, 114 and 112 on dial 110.

The use of the preferred and alternate forms of the testing device has been described previously in detail and need not be repeated.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:

1. A device for testing shock absorbers on an automotive vehicle having a sprung portion, at least a part of which extends inwardly from substantially a vertical section thereof and wheels that support an unsprung portion of said vehicle, including:
   (a) a bracket;
   (b) first means for removably affixing said bracket to said inwardly extending part of said sprung portion of said vehicle that includes:
      (1) two transversely spaced L-shaped members, each of which includes a substantially vertical leg and a substantially horizontal leg;
      (2) a transverse crossbar affixed to the upper portions of said vertical legs;
      (3) a first inverted channel that extends transversely between said vertical legs below said crossbar and is rigidly affixed to said legs;
      (4) a slide longitudinally movable on said horizontal legs, with said slide having a tapped bore formed therein above the space defined between said horizontal legs;
      (5) a threaded rod that engages said tapped bore;
      (6) a second channel transversely disposed above said horizontal legs and rotatably engaging the upper end of said rod; and
      (7) a handle for rotating said rod to move said second channel upwardly relative to said first channel to removably grip said inwardly extending part of said sprung portion when said vertically extending part of said sprung portion is in abutting contact with said crossbar
   (c) a roller;
   (d) a rigid elongate member extending upwardly from said roller;
   (e) two vertically spaced and vertically aligned eyes on said bracket through which said member extends;
   (f) a vertically adjustable collar mounted on said member and disposed between said eyes;
   (g) spring means that at all times urge said member and collar downwardly relative to said bracket;
   (h) electric switch means mounted on said bracket, which means includes a spring-loaded actuator that maintains said switch means in an open condition so long as a force is exerted on said actuator;
   (i) second means that move concurrently with said member and at all times tend to maintain said force on said actuator;
   (j) a dial for visually indicating the condition of said shock absorbers;
   (k) a geared down electric motor;
   (l) a needle rotated by said motor and so disposed as to sweep over said dial;
   (m) third means for supporting said dial and motor from said bracket; and
   (n) an electric circuit that includes said switch and motor, which motor is energized to rotate said needle to indicate the condition of said shock absorbers when said switch means closes due to separation of said second means from said actuator when one of said wheels and roller are concurrently driven off an abrupt drop-off to cause oscillation of said sprung portion relative to said unsprung portion.

2. A device as defined in claim 1 in which said first means further includes:
   (8) hinge means that pivotally connect said horizontal legs to said bracket; and
   (9) fourth means for pivoting said bracket to, and maintaining said bracket at a desired angle relative to said horizontal legs to dispose said elongate member in a vertical position.

3. A device as defined in claim 2 wherein said fifth means comprises:
   (10) an upright mounted on said horizontal legs that defines a tapped bore;
   (11) a threaded rod which engages said tapped bore;
   (12) a pivotally mounted member on said bracket that threadedly engages said rod; and
   (13) a handle for rotating said threaded member.

4. A device as defined in claim 1 wherein said spring means comprises a compressed helical spring that encircles said elongate member, with the lower end of said spring resting on said collar, and the upper end of said spring exerting a force on the uppermost of said eyes.

5. A device as defined in claim 1 wherein said second means is a clip affixed to said collar.

6. A device as defined in claim 1 wherein said third means is a panel that extends outwardly from said bracket.

7. A device as defined in claim 1 which further includes:
   (o) a normally open switch in said circuit that can be closed to energize said motor to move said needle into a starting position relative to said dial.

8. A device for testing shock absorbers on an automotive vehicle having a sprung portion that includes a bumper, with wheels supporting an unsprung portion of said vehicle, comprising:
   (a) a bracket;
   (b) first means for removably affixing said bracket to said bumper that include:
      (1) an elongate body having a tapped longitudinally extending bore formed therein;
      (2) a screw rotatably supported in said bore;
      (3) a handle for rotating said screw;
      (4) a pressure-exerting member rotatably supported on the end of said screw opposite that on which said handle is mounted;
      (5) two transversely spaced chains extending from the end of said body adjacent said pressure-exerting member;
      (6) two hooks connected to said chains that can engage opposite longitudinal edges of a bumper on said vehicle when said pressure-exerting member is disposed adjacent thereto;
      (7) a handle for rotating said screw to move said pressure-exerting member towards said bumper until said chains are taut and said elongate body is removably held in a fixed position relative thereto;
      (8) means for holding said bracket in a fixed position relative to said elongate body;
   (c) a roller;
   (d) a rigid elongate member extending upwardly from said roller;
   (e) two vertically spaced and vertically aligned eyes on said bracket through which said member extends;
   (f) a vertically adjustable collar mounted on said member and disposed between said eyes;
   (g) spring means that at all times urge said member and collar downwardly relative to said bracket;
   (h) electric switch means mounted on said bracket, which means includes a spring-loaded actuator that maintains said switch means in an open condition so long as a force is exerted on said actuator;

(i) second means that move concurrently with said member and at all times tend to maintain said force on said actuator;

(j) a dial for visually indicating the condition of said shock absorbers;

(k) a geared down electric motor;

(l) a needle rotated by said motor and so disposed as to sweep over said dial;

(m) third means for supporting said dial and motor from said bracket; and (n) an electric circuit that includes said switch and motor, which motor is energized to rotate said needle to indicate the condition of said shock absorbers when said switch means closes due to separation of said second means from said actuator when one of said wheels and roller are concurrently driven off an abrupt drop-off to cause oscillation of said sprung portion relative to said unsprung portion.

References Cited by the Examiner
UNITED STATES PATENTS

| | | | |
|---|---|---|---|
| 2,034,649 | 3/1936 | Brown | 73—517 X |
| 2,629,030 | 2/1953 | Taylor et al. | 73—517 X |
| 3,164,003 | 1/1965 | MacMillan | 73—11 |

RICHARD C. QUEISSER, *Primary Examiner.*

J. W. MYRACLE, *Assistant Examiner.*